Aug. 22, 1939.  W. GUMPRICH  2,170,197
SPRING TESTING SCALE
Filed June 4, 1932  2 Sheets-Sheet 2
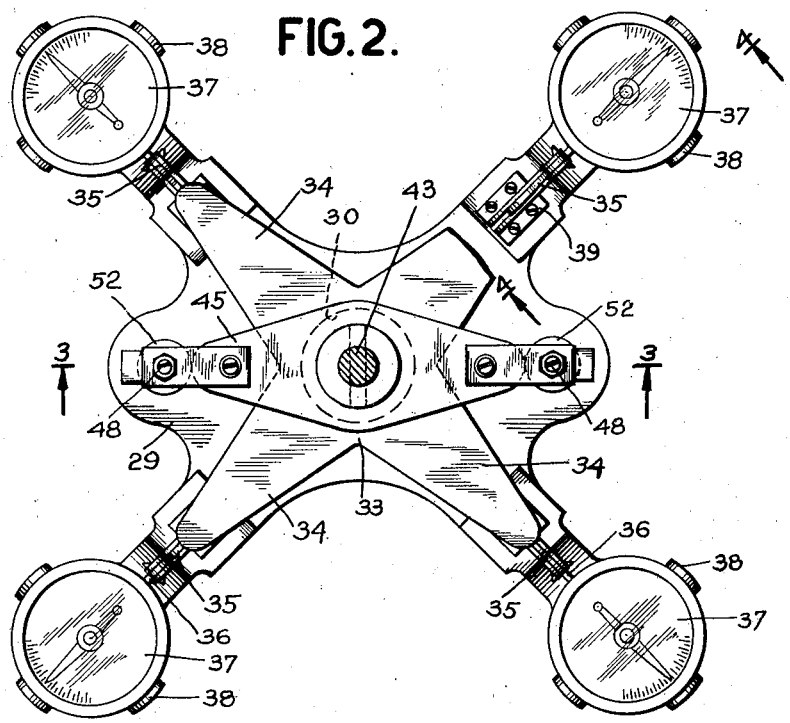
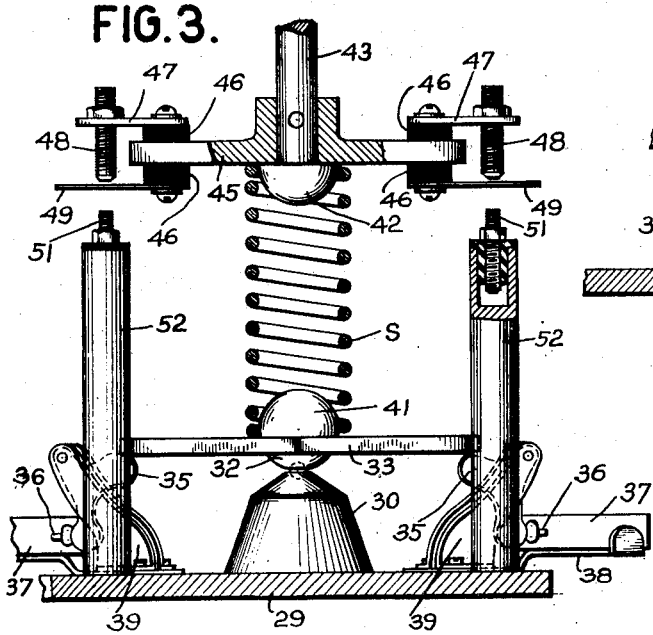
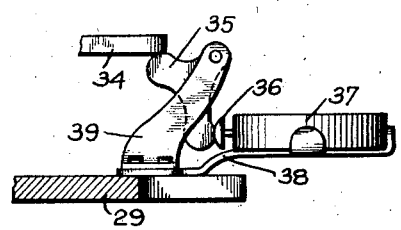
INVENTOR-
William Gumprich
BY
[signature]
ATTORNEY- Patented Aug. 22, 1939

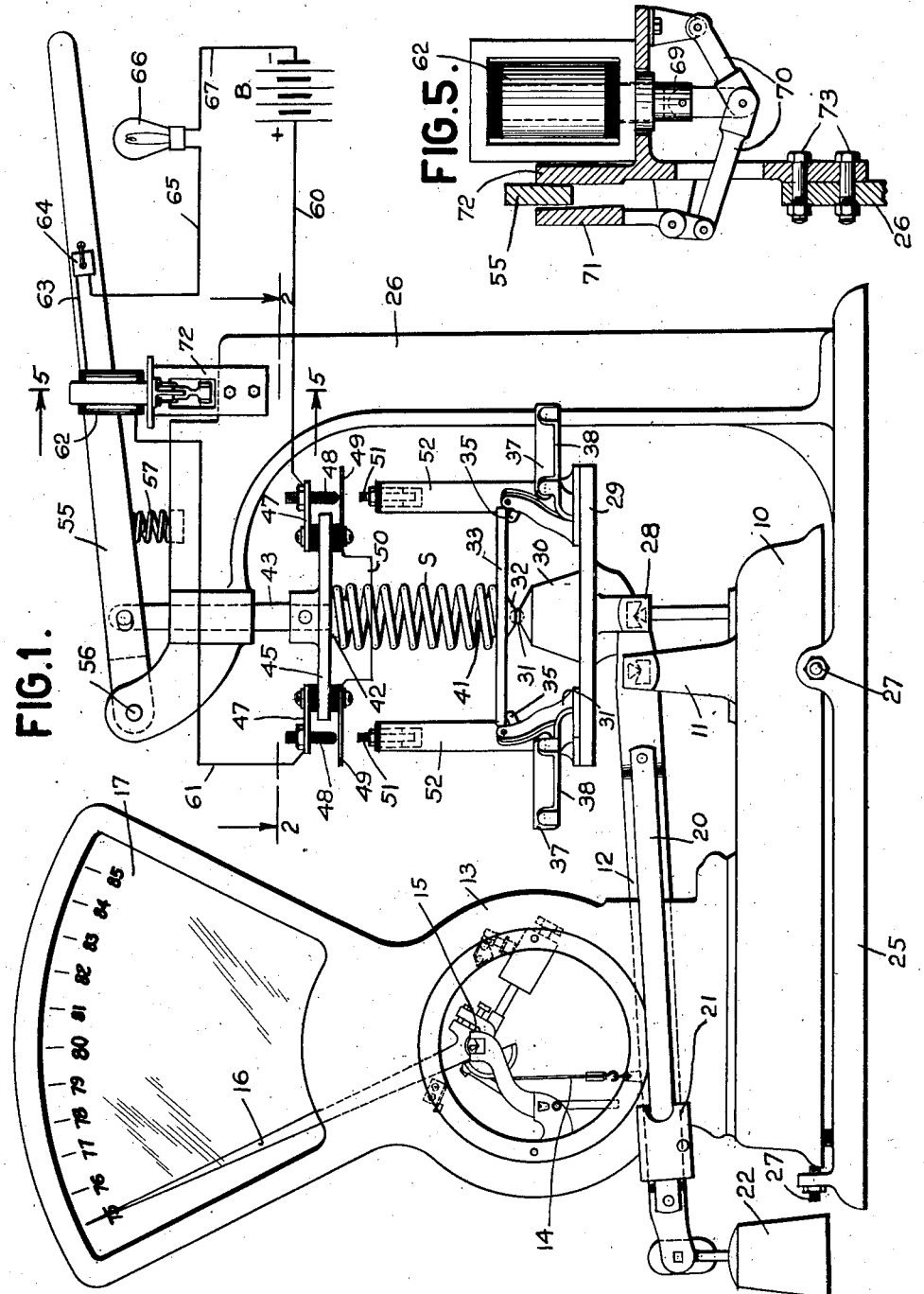

2,170,197

UNITED STATES PATENT OFFICE 2,170,197

SPRING TESTING SCALE

William Gumprich, Brooklyn, N. Y., assignor, by mesne assignments, to American Coil Spring Company, Muskegon, Mich., a corporation of Michigan Application June 4, 1932, Serial No. 615,305

11 Claims. (Cl. 265—16)

This case relates to machines for testing articles and particularly to machines for testing coil springs.

It is desirable that the springs apply a certain predetermined pressure when compressed a predetermined amount.

The object of the invention is to provide an improved means for testing the strength of springs of the coil type, especially those used for lifting valves and known as valve springs.

A further object is to provide a means for testing the compression of valve springs by means of a weighing scale.

Still further, the object is to provide such a testing scale in combination with means for determining the uniformity of strength of the valve spring around its circumference.

More specifically, the latter object is to provide pressure gages for determining the differences in stiffness of a spring about its circumference.

Another object is to provide electrically operated means for indicating that the required compression of the spring has been effected.

Still further the object is to provide means for automatically locking the means for compressing the spring when the latter has been compressed the required amount.

Further and other objects and advantages will be hereinafter set forth in the accompanying specification and claims and shown in the drawings, which by way of illustration show what is now considered to be the preferred embodiment of the invention.

Fig. 1 is a front view of the scale with the means for compressing and supporting valve springs for testing purposes in connection with the circuit for energizing the locking magnet and the signal;

Fig. 2 is a section along line 2—2 of Fig. 1;

Fig. 3 is a section on line 3—3 of Fig. 2;

Fig. 4 is a section on line 4—4 of Fig. 2, and

Fig. 5 is a section on line 5—5 of Fig. 1.

Referring to the drawings in detail the scale comprises a base 10 having a support 11 on which is fulcrumed base lever 12 which extends into the housing 13 and is there connected by tape 14 to the pendulum assembly 15 carrying also the pointer 16 for reading fan chart 17. Chart 17 is graduated to read from 75 to 85 pounds which is the range of pressure obtained from springs which have a required standard pressure of 80 lbs. The base lever 12 carries the tare lever 20 provided with the adjustable poise 21 and the hanging weight 22. Poise 21 and weight 22 are so adjusted as to compensate for the dead weight of the platform and the parts carried thereby and to provide an additional backweighting force equivalent to 75 lbs. pressure on the platform. The scale base 10 is mounted in a frame having a base 25 integral with an upright bracket 26. The base 25 is provided with clamping screws 27 to locate and retain the base 10 of the scale in proper position. Base lever 12 pivotally mounts the stem 28 of the platform 29 which is rigidly provided with a block 30. At the center of this block is set in a ball 31 which is in line with the stem 28. Supported on top of ball 31 and located with respect thereto by a member 32 having a substantially semi-circular seat is an auxiliary platform 33. The ball 31 provides a universal pivot for permitting rocking of auxiliary platform 33 in any direction. The auxiliary platform comprises four arms 34 90° apart, each arm bearing on one end of a bell lever 35, the other end of which contacts the head of plunger 36 of a gauge 37. The main platform 29 carries brackets 38, each holding one of the gauges 37 and brackets 39 for pivotally mounting bell levers 35.

Auxiliary platform 33 is provided at its upper side with a spherically curved block 41 for locating the lower end of the valve spring S to be tested, the upper end of the spring being located by a semi-spherical block 42. The block 42 is at the lower end of a rod 43 which passes through a central hole in a member 45 and which is pinned to the member to rigidly fix the block 42 and its rod relative to said member. Member 45 lies parallel to main platform 29 and is placed with each end above the space between adjacent arms 34 of auxiliary platform 33. Each end of the member 45 carries upper and lower insulating blocks 46, the upper ones having secured thereto plates 47 in which are threaded contact screws 48. The lower blocks 46 carry contact blades 49 connected by conductor 50. The blades are adapted to engage screws 51 mounted in but insulated from posts 52 carried by main platform 29.

Standard 26 is provided with means for guiding rod 43 and constraining it and the member 45 carried thereby to vertical translatory movement. The upper end of rod 43 has a pin and slot connection with lever 55 which is pivoted at 56 to the free end of standard 26. Lever 55 is normally held in raised position by a coil spring 57.

The operation of the above parts may be understood from the following description:

Upon depression of the handle 55 to compress the spring S the required distance screws 51 engage the blades 49 raising them into contact with screws 48 and completing a circuit which may be traced as follows: From the plus side of battery B through lead 60 to the right hand screw 48 (as viewed in Fig. 1), through coacting blade 49, lead 50, the other blade 49 and screw 48, lead 61, through solenoid 62, lead 63, finger switch 64 mounted on lever 55 and now closed, lead 65, signal lamp 66, and lead 67 to the minus side of the battery B.

Solenoid 62 upon energization attracts its core 69 to expand toggle linkage 70 and thereby rocks locking lever 71 in a direction to engage and lock the lever 55 against stationary plate 72 secured by bolts 73 to the upper end of standard 26.

The lighting of signal 66 warns the operator to stop depressing handle 55 while the magnet 62 operates means to lock the lever when the latter has compressed the spring S the required distance. The reading of the indicator hand 16 on chart 17 at this time gives the total pressure exerted by the spring S when compressed the required distance while the individual gauges 37 indicate whether the auxiliary platform 33 has tilted which will happen only when the pressure exerted by the spring S is not evenly distributed about its circumference. If the platform 33 is tilted, the levers 35 will be rocked to change the position of the plungers 36 and the readings of gauges 37. When the readings of gauges 37 differ by more than a specified tolerance, the spring is graded "defective" even though the indicator 16 indicates the correct total pressure of 80 pounds.

While the invention has been explained in connection with a hollow object such as a coil spring, obviously the same principles can be used to test a solid object. In the latter case, if the strength of the object throughout its cross-section is not the same, then the object will bend under the applied pressure and platform 33 will tilt according to the cross-sectional distribution of strength of the object. Such modifications, variations, and changes in the form of the illustrated invention as are in the field of mechanical skill are considered as embodied in the present invention and therefore it is desired to be limited only by the following claims.

I claim:

1. In a device for testing coil springs, a platform to support and locate a coil spring under test, means to compress the spring, means for mounting the platform for movement in one direction under the total pressure transmitted through the spring and for also mounting the platform for movement having a component in a direction transverse to the first-named direction and proportional to the differences in pressure transmitted through circumferentially-spaced parts of the spring varying in strength, indicating means connected to the platform and operable upon movement of the platform in the first-named direction in accordance with the total pressure of the spring under compression, and other indicating means cooperating with and operated by the platform according to its component of movement in the second-named direction to indicate the distribution of strength of the spring about its circumference.

2. In a device for testing coil springs, a lever, tiltable means operatively carried by said lever and having provisions for supporting and centering a coil spring to be tested, means for compressing the spring to rock the lever indicating means operable upon rocking of the lever to indicate according to the pressure of the compressed spring, and means operated solely by and in accordance with the tilting of the tiltable means to indicate according to uniformity of strength of the spring about its circumference.

3. In a device for testing coil springs, a lever, a coil spring support operatively carried thereby and having a spherically curved element for entering one end of the spring to center said end, a device for compressing the spring including another spherically curved element for entering the other end of the spring to center said end, and indicating means operable upon rocking of the lever to indicate according to pressure of the compressed spring, said coil spring support being tiltably connected to the lever, and indicating means operated by said support in accordance with the tilting of said support.

4. In a testing machine, a member for supporting a resilient object to be tested, means for changing a dimension of said object, a device movable into and out of locking coaction with said means, a control for said device, means responsive to relative movement between the dimension changing means and the object supporting member for rendering said device effective to cause the device to move into locking coaction with said means when the dimension of the object has been changed a predetermined amount, and an indicator operatively connected to said member for indicating in accordance with the variation in resistance of the object as its dimension is varied.

5. In a spring testing machine, a member for supporting a resilient object to be tested, means for changing a dimension of said object, a device for locking said means when the dimension of the object has been changed a predetermined amount, and an indicator operatively connected to said member for indicating in accordance with the variation in resistance of the object as its dimension is varied, said locking device comprising a solenoid, a brake member operated by the solenoid, a circuit for energizing the solenoid, and contacts automatically closed upon movement of the said means a certain distance to complete said circuit.

6. In a spring testing machine, a member for supporting a resilient object to be tested, means for changing a dimension of said object, a device for locking said means when the dimension of the object has been changed a predetermined amount, and an indicator operatively connected to said member for indicating in accordance with the variation in resistance of the object as its dimension is varied, electrical means for operating the locking device upon movement of said means a certain distance, and an electrically operated signal for indicating to the operator that the said means has been operated said certain distance.

7. In a machine of the class described, a platform having provision for centering and holding the lower end of a coil spring, a movement-multiplying lever for carrying said platform, a base frame on which the lever is fulcrumed, a generally vertical housing rising from the base and having a reading window, pendulum counterbalancing means within said housing, a ribbon connection between the lever and the counterbalancing means, indicating means within the housing comprising a chart and index viewed through said window and relatively operated by the counterbalancing means to indicate pressures, a device above the platform for centering the upper end of said spring, an actuator freely operable in one direction for moving said device towards the platform to compress the spring and thereby depress the platform to rock the lever and operate the counterbalancing and indicating means, stopping means to engage the actuator and stop its movement, and means for automatically moving said stopping means to engage and stop the actuator when the spring has been compressed a desired distance.

8. In a machine of the class described, pressure indicating and resisting means, a main platform carried by said means, a plurality of gages completely carried by the main platform, an auxiliary platform tiltably mounted on the main platform and having provisions for automatically operating said gages only when tilted in accordance with the direction and degree of tilt, and means for compressing an object carried by the auxiliary platform to thereby depress the both platforms and operate the pressure indicating and resisting means and to tilt the auxiliary platform to indicate the difference in compressive strength of the object at different points of its periphery.

9. In a testing machine, a pair of abutments between which an object under test is placed, means for moving the abutments relatively to change a dimension of the object under test, means for mounting one of the abutments to move proportionately to the total force exerted thereon through the object under test upon said relative movement, means for automatically terminating said relative movement, and a pair of elements, each responsive to movement of a different one of the abutments coacting with each other to cause said terminating means to automatically stop said relative movement.

10. In an apparatus for testing the distortional transmission of forces about the periphery of the end of a spring while the spring is compressed within its working range, the combination of a plunger having a suitable head adapted to receive one end of a spring, a cooperating test head adapted to receive the opposite end of the spring, a universal joint for said test head, and means to indicate angular deflection of said test head in any direction caused by the distortional forces exerted about the periphery of the end of the spring being tested.

11. In an apparatus for testing the distortional transmission of forces about the periphery of the end of a coil spring while the spring is stressed within its working range, the combination of a suitable head to receive one end of the spring, a cooperating test head to receive the opposite end of the spring, means for moving one of the heads relatively to the other to stress the spring within its working range, a universal joint for said test head, and means to indicate angular deflection of said test head in any direction caused by distortional forces exerted about the periphery of the end of the spring being tested.

WILLIAM GUMPRICH.